(12) United States Patent
Kraemer et al.

(10) Patent No.: US 9,308,496 B2
(45) Date of Patent: Apr. 12, 2016

(54) SYSTEM AND METHOD FOR CONTROLLING AND REDUCING NOX EMISSIONS

(75) Inventors: Gilbert Otto Kraemer, Greer, SC (US); Gregory Allen Boardman, Greer, SC (US)

(73) Assignee: General Electric Company, Schenectady, NY (US)

(*) Notice: Subject to any disclaimer, the term of this patent is extended or adjusted under 35 U.S.C. 154(b) by 390 days.

(21) Appl. No.: 12/766,584

(22) Filed: Apr. 23, 2010

(65) Prior Publication Data

US 2011/0262334 A1 Oct. 27, 2011

(51) Int. Cl.
*B01D 53/86* (2006.01)
*B01D 53/75* (2006.01)
*B01D 53/14* (2006.01)
*B01D 53/94* (2006.01)

(52) U.S. Cl.
CPC ............ *B01D 53/8625* (2013.01); *B01D 53/75* (2013.01); *B01D 53/1431* (2013.01); *B01D 53/9409* (2013.01); *B01D 2251/404* (2013.01); *B01D 2251/606* (2013.01); *B01D 2252/103* (2013.01); *B01D 2255/1021* (2013.01); *B01D 2257/404* (2013.01); *B01D 2257/502* (2013.01)

(58) Field of Classification Search
None
See application file for complete search history.

(56) References Cited

U.S. PATENT DOCUMENTS

| | | | | |
|---|---|---|---|---|
| 3,649,188 | A * | 3/1972 | Keilin et al. | 423/524 |
| 5,348,715 | A * | 9/1994 | Chang | B01D 53/60 423/235 |
| 5,650,127 | A | 7/1997 | Campbell et al. | |
| 6,038,853 | A * | 3/2000 | Penetrante | B01D 53/323 422/171 |
| 6,063,348 | A * | 5/2000 | Hinke et al. | 423/235 |
| 6,866,834 | B2 | 3/2005 | Nakamura et al. | |
| 6,875,409 | B1 * | 4/2005 | Zhou et al. | 423/239.1 |
| 6,918,253 | B2 * | 7/2005 | Fassbender | 60/649 |
| 7,390,471 | B2 | 6/2008 | Sobolevskiy et al. | |
| 7,498,010 | B2 | 3/2009 | Andreasson et al. | |
| 7,708,804 | B2 * | 5/2010 | Darde et al. | 95/129 |
| 2001/0014297 | A1 * | 8/2001 | Neufert | 422/177 |
| 2008/0274876 | A1 * | 11/2008 | Ott | 502/65 |
| 2009/0246096 | A1 * | 10/2009 | Miwa et al. | 422/177 |
| 2009/0269265 | A1 * | 10/2009 | Ando | B01D 53/90 423/239.2 |
| 2010/0215558 | A1 | 8/2010 | Kraemer et al. | |
| 2011/0052454 | A1 * | 3/2011 | Kato | 422/171 |

FOREIGN PATENT DOCUMENTS

| | | | |
|---|---|---|---|
| CN | 101337151 | * | 1/2009 |
| CN | 101337151 A | | 1/2009 |
| EP | 2172627 A1 | | 4/2010 |
| JP | 61111127 A | | 5/1986 |
| JP | 2006336589 A | | 12/2006 |
| WO | 0021647 A1 | | 4/2000 |
| WO | 2004048852 A1 | | 6/2004 |

OTHER PUBLICATIONS

Yang, Chen-Lu, et al. "Oxidation of nitrific oxide in a two-stage chemcial scrubber using dc corona discharge". Journal of Hazardous Materials B80, 135-146 (2000).*
EP Search Report issued Jul. 28, 2011 in connection with corresponding EP Application No. 11163244.4.
EP Search Report issued Aug. 8, 2011 in connection with corresponding EP Application No. 11162748.5.
Unofficial English translation of Chinese Office Action issued in connection with corresponding CN Application No. 201110112738.3 on Feb. 8, 2014.
Unofficial English translation of Chinese Office Action issued in connection with corresponding CN Application No. 201110113814.2 on Feb. 8, 2014.

* cited by examiner

*Primary Examiner* — Melvin C Mayes
*Assistant Examiner* — Sheng H Davis
(74) *Attorney, Agent, or Firm* — Sutherland Asbill & Brennan LLP

(57) ABSTRACT

Methods and systems are provided for reducing NOx emissions from a gas stream produced by a production source. The method may comprise oxidizing a substantial portion of NO gas present in the gas stream by contacting the gas stream with an oxidation catalyst to yield higher order $N_xO_y$ molecules; and thereafter removing higher order $N_xO_y$ molecules from the gas stream by solvent absorption or reaction. The system may comprise a gas production source configured to produce a gas stream comprising NOx; an oxidation catalyst positioned downstream of the gas production source, wherein the oxidation catalyst is configured to oxidize NO gas molecules in the gas stream to yield higher order $N_xO_y$ molecules; and a removal device positioned downstream of the oxidation catalyst configured to remove higher order $N_xO_y$ molecules from the gas stream by solvent absorption or reaction.

7 Claims, 1 Drawing Sheet

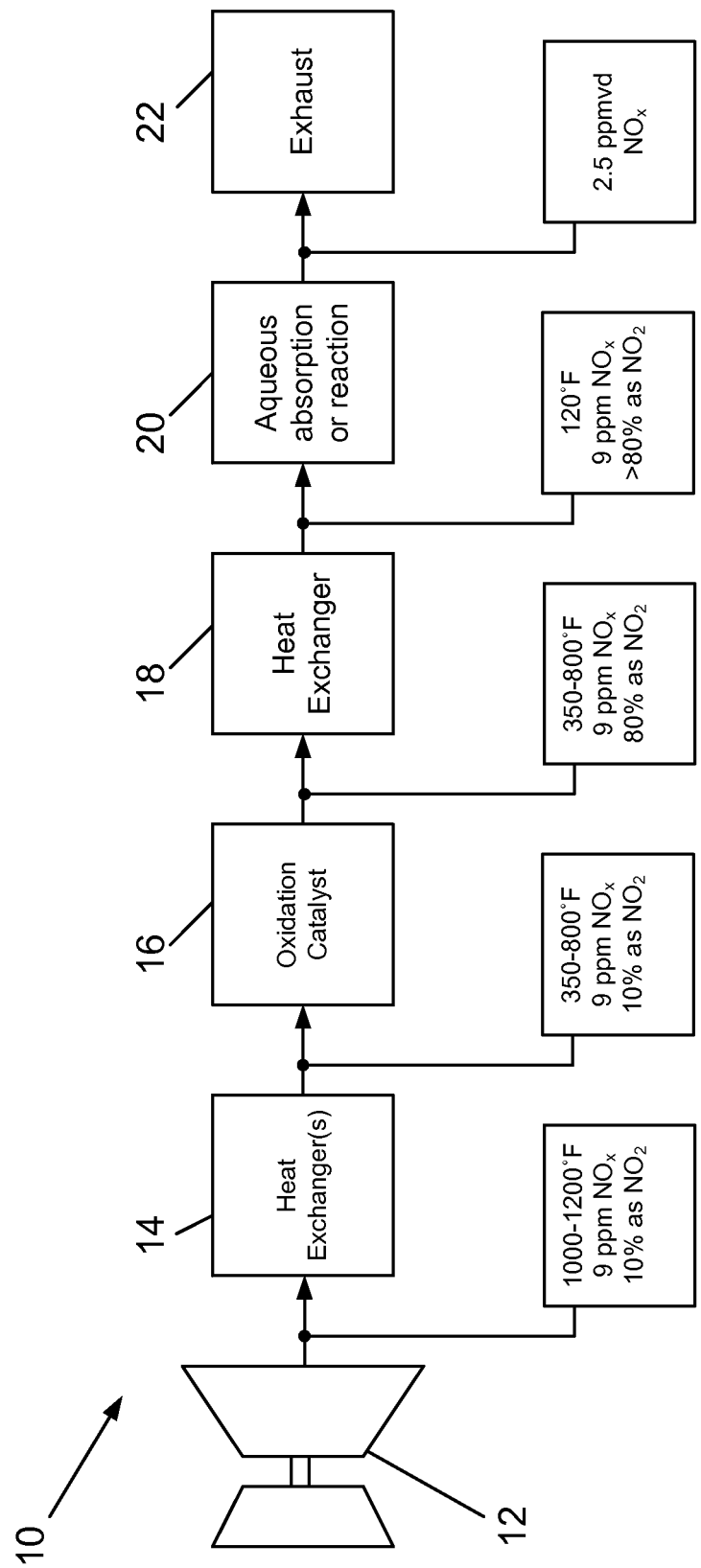

SYSTEM AND METHOD FOR CONTROLLING AND REDUCING NOX EMISSIONS

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is generally in the field of $NO_x$ emission abatement. More particularly, the present invention is directed to systems and methods for reducing $NO_x$ emissions from $NO_x$ producing sources.

$NO_x$ emissions are a concern for many industries, particularly in power-generating industries. $NO_x$ production is common in high-temperature combustion applications and/or with the combustion of nitrogen-bearing fuels. At high combustion temperatures, diatomic nitrogen in the combustion air may be oxidized to produce $NO_x$. Nitrogen in the fuel may also be released as free radicals during combustion to form $NO_x$. $NO_x$ emissions are generally known to cause acid rain as well as deleterious health side effects and are, therefore, a subject of regulatory scrutiny.

One common approach to NOx reduction involves the injection of a reducing agent over a catalyst to convert $NO_x$ to $N_2$. Even more specifically, the use of ammonia with a selective catalytic reduction ("SCR") catalyst is presently the most common approach to $NO_x$ reduction. In some applications, this approach may be effective for removing 80 to 95% of $NO_x$ from a gas stream; however, the use of an ammonia reactant may be a significant operating cost.

As such, it would be desirable to provide new systems and methods for $NO_x$ reduction. It would also be desirable to provide new systems and methods for $NO_x$ reduction that eliminate the need for or reduce the utilization of reducing reactants such as ammonia.

BRIEF SUMMARY OF THE INVENTION

In one aspect, a method is provided for reducing $NO_x$ emissions from a gas stream produced by a production source. The method may comprise oxidizing a substantial portion of NO gas present in the gas stream by contacting the gas stream with an oxidation catalyst to yield higher order $N_xO_y$ molecules; and thereafter removing higher order $N_xO_y$ molecules from the gas stream by solvent absorption or reaction.

In another aspect, a system is provided for reducing NOx emissions. The system may comprise a gas production source configured to produce a gas stream comprising $NO_x$; an oxidation catalyst positioned downstream of the gas production source, wherein the oxidation catalyst is configured to oxidize NO gas molecules in the gas stream to yield higher order $N_xO_y$ molecules; and a removal device positioned downstream of the oxidation catalyst configured to remove higher order $N_xO_y$ molecules from the gas stream by solvent absorption or reaction.

BRIEF DESCRIPTION OF THE DRAWINGS

FIG. 1 is a diagram, illustrating a system for reducing $NO_x$ emissions in accordance with one or more embodiments of the present invention.

DETAILED DESCRIPTION OF THE INVENTION

Systems and methods are provided for reducing $NO_x$ emissions from $NO_x$ producing sources. The systems and methods may be used in various $NO_x$ producing applications, including, but not limited to, gas combustion, steam production, and hydrocarbon refining applications. The systems and methods may generally be employed in any application in which a gas stream comprising $NO_x$ is produced. In an exemplary embodiment, systems and methods of the present invention may be employed to reduce $NO_x$ emissions from a gas turbine engine. In another embodiment, systems and methods of the present invention may be employed to reduce $NO_x$ emissions from a boiler. In yet another embodiment, systems and methods of the present invention may be employed to reduce $NO_x$ emissions from a refinery.

Systems and methods of the present invention may achieve abatement of $NO_x$ from a gas stream primarily by the oxidation of NO molecules in the gas stream to higher order $N_xO_y$ molecules, and the subsequent removal of the higher order $N_xO_y$ molecules by solvent absorption or reaction. Such an approach may advantageously avoid or reduce the need for the continuous injection of reducing agents. In some embodiments, the system may remove 80 to 95% of $NO_x$ from the post-combustion gas stream without the addition of reactants to the gas stream. Similarly, such an system may reduce or eliminate the need for addition of oxidizing agents or energy sources such as ozone ($O_3$) to create $N_xO_y$ species with higher solvent absorption or reaction like $N_2O_5$.

The term "higher order $N_xO_y$ molecules", as used herein, refers to $N_xO_y$ molecules in which the value of x and/or y is greater than 1. These molecules may be the product of the oxidation of NO. For example, the term higher order $N_xO_y$ molecules encompasses $NO_2$ and $N_2O_5$. The term also encompasses other nitrogen oxides that are of a higher order than NO, including $N_2O$, $N_2O_3$, and $N_2O_4$.

Methods

In one aspect, methods are provided for reducing $NO_x$ emissions from a gas stream produced by a production source. The method may comprise oxidizing a substantial portion of NO gas present in the gas stream by contacting the gas stream with an oxidation catalyst to yield higher order $N_xO_y$ molecules (such as $NO_2$ and/or $N_2O_5$), and thereafter removing $NO_2$ gas from the gas stream by aqueous absorption or reaction.

As used herein, the term "oxidation catalyst" generally refers to a device that oxidizes NO molecules to yield higher order $N_xO_y$ molecules, e.g., $NO_2$ and/or $N_2O_5$. The oxidation catalyst may be a flow through device having an internal honeycomb structure coated with the chemical catalyst. In one embodiment, the oxidation catalyst may be a CO catalyst. In some embodiments, the oxidation catalyst is configured to oxidize a sufficient quantity of NO molecules in the gas stream such that the majority of $N_xO_y$ molecules in the gas stream exiting the oxidation catalyst are $NO_2$ molecules. In some embodiments, the majority of $NO_x$ molecules in the gas stream are NO molecules before the gas stream is contacted with the oxidation catalyst. Preferably, the oxidation catalyst may be placed at a location along the gas stream flow path where it will be exposed to gas stream temperatures in the range of about 350° F. to about 700° F. It has been found that operating the oxidation catalyst at such a temperature range may advantageously allow the catalyst to thermodynamically favor the production $N_xO_y$ due to the lower operating temperature while providing an adequate temperature to achieve the desired rate kinetics over the catalyst surface. It has also been found that the presence of $SO_x$ to the exhaust stream may shift the optimal temperature to the higher value.

In an exemplary embodiment, a conventional gas turbine engine may produce a gas stream in which about 90% of the $NO_x$ molecules are NO. The oxidation catalyst may be configured to produce a gas stream in which about 50% or more of the $NO_x$ molecules are higher order $N_xO_y$ molecules (e.g., $NO_2$, and or $N_2O_5$), or more preferably about 70% or more of the $NO_x$ molecules are higher order $N_xO_y$ molecules, or even more preferably about 80% or more of the $NO_x$ molecules are higher order $N_xO_y$ molecules. For a CO catalyst not treated with $NO_x$ oxidation inhibitors, greater than 80% higher order $N_xO_y$ in $NO_x$ may be achieved at temperatures of about 700° F. or below. An oxidation efficiency of about 85% may be achieved in the range of about 350° F. to about 700° F. using a platinum-based oxidation catalyst. The range may vary depending on catalyst composition, catalyst surface treatment, and catalyst surface area.

In some embodiments, the method may further comprise combusting a fuel to produce the gas stream, wherein the gas stream comprises the reaction products of the combustion of the fuel. For example, the fuel may comprise a hydrocarbon fuels, a non-hydrocarbon fuel or combinations thereof. In exemplary embodiments, the fuel may comprise natural gas, oil or coal. The gas stream may be produced by various production sources including, but not limited to, a gas turbine, a boiler, a furnace, refinery, or a chemical processing plant.

Higher order $N_xO_y$ molecules in the gas stream may be removed downstream of the oxidation catalyst by solvent absorption (such as by aqueous absorption) or reaction. The higher order $N_xO_y$ molecules, particularly $NO_2$ and $N_2O_5$ molecules, are soluble in water, and may be removed from the gas stream by applying water to the gas stream. For example, water may be sprayed into the gas stream to absorb higher order $N_xO_y$ molecules in the gas stream. The water and higher order $N_xO_y$ molecules may be thereafter separated from the gas stream. In certain embodiments, a water collector adapted to condense water vapor in the gas stream may be placed downstream of the oxidation catalyst. In another embodiment, an aqueous or other solvent film is support on a high surface area structure, such as a demister pad, and $N_xO_y$ transport to the film. The condensed water may absorb higher order $N_xO_y$ molecules in the gas stream and the water and higher order $N_xO_y$ molecules may be thereafter separated from the gas stream. In other embodiments, the higher order $N_xO_y$ molecules may be separated by reaction of the higher order $N_xO_y$ molecules with a reactant. For example, $NO_2$ molecules may contact and react with soda lime, such as in a lime based water solution.

In certain embodiments, the oxidation of NO molecules to higher order $N_xO_y$ molecules and aqueous absorption and/or reaction of the higher order $N_xO_y$ molecules is performed in a manner effective to remove at least 40% of the $NO_x$ molecules from the gas stream. In a preferred embodiment, the oxidation of NO molecules to higher order $N_xO_y$ molecules and aqueous absorption and/or reaction of the higher order $N_xO_y$ molecules is performed in a manner effective to remove at least 75% of the $NO_x$ molecules from the gas stream. Such a level of $NO_x$ reduction may advantageously be achieved without the addition of ammonia.

Systems

In another aspect, systems are provided for reducing $NO_x$ emissions. The system may comprise a gas production source configured to produce a gas stream comprising $NO_x$; an oxidation catalyst positioned downstream of the gas production source, the oxidation catalyst configured to oxidize NO gas molecules in the gas stream to yield higher order $N_xO_y$ molecules; and a removal device positioned downstream of the oxidation catalyst configured to remove $N_xO_y$ molecules from the gas stream by aqueous absorption or reaction.

In some embodiments, the system may include a gas production source that is configured to combust a fuel to produce the gas stream comprising the reaction products of the combustion of the fuel. The fuel may comprise a hydrocarbon fuel such as natural gas, oil or coal. The gas stream may be produced by various production sources including, but not limited to, a gas turbine, a boiler, a furnace or a chemical processing plant (such as a refinery).

Higher order $N_xO_y$ molecules in the gas stream may be removed downstream of the oxidation catalyst by aqueous absorption or reaction. The higher order $N_xO_y$ molecules are soluble in water, and may be removed from the gas stream by applying water to the gas stream. For example, water may be sprayed into the gas stream by a water injecting device, e.g., through one or more spray nozzles, to absorb higher order $N_xO_y$ molecules in the gas stream. The water and higher order $N_xO_y$ molecules may be thereafter separated from the gas stream. In certain embodiments, a water collector adapted to condense water vapor in the gas stream may be placed downstream of the oxidation catalyst. The condensed water may absorb higher order $N_xO_y$ molecules in the gas stream and the water and higher order $N_xO_y$ molecules may be thereafter separated from the gas stream. In other embodiments, the higher order $N_xO_y$ molecules may be separated by reaction of the higher order $N_xO_y$ molecules with a reactant. For example, the higher order $N_xO_y$ molecules may contact and react with soda lime solution.

In certain embodiments, the oxidation of NO molecules to higher order $N_xO_y$ molecules and aqueous absorption and/or reaction of the higher order $N_xO_y$ molecules is performed in a manner effective to remove at least 40% of the $NO_x$ molecules from the gas stream. In a preferred embodiment, the oxidation of NO molecules to higher order $N_xO_y$ molecules and aqueous absorption and/or reaction of the higher order $N_xO_y$ molecules is performed in a manner effective to remove at least 75% of the $NO_x$ molecules from the gas stream. Such a level of $NO_x$ reduction may advantageously be achieved without the addition of ammonia.

An embodiment of a system for reducing NOx emissions is illustrated in FIG. 1. The system 10 may have a $NO_x$ production source, such as a gas turbine engine 12. The gas turbine engine 12 may produce a gas stream having an exhaust temperature of about 800 to about 1200° F. and a $NO_x$ concentration of 9 ppm. Approximately 10% of the $NO_x$ emissions may comprise $NO_2$ and the balance primarily NO. The gas stream may pass through one or more heat exchangers 14 so that the gas stream may be cooled to about 350 to about 800° F. The gas stream may then pass through an oxidation catalyst 16 where a substantial portion of the NO molecules are oxidized to higher order $N_xO_y$ molecules. In the embodiment of FIG. 1, the gas stream exiting the oxidation catalyst 16 may have a $NO_x$ concentration of 9 ppm with approximately 80% of the $NO_x$ emissions comprising $NO_2$ or other higher order nitrogen oxides such as $N_2O_5$. The gas stream may then be further cooled to about 120° F. in a heat exchanger 18.

The cooled gas stream may then pass through a vessel 20 where the $N_xO_y$ is scrubbed in a solvent, such as an aqueous solvent, and absorbed or reacted and then removed from the gas stream. For example, the vessel 20 may comprise a water injecting device that injects water or other solvent for $N_xO_y$ into the gas stream. In some embodiments, the vessel 20 may comprise a water collecting device that condenses water vapor in the gas stream. The liquid water and absorbed higher order $N_xO_y$ molecules may then be separated from the gas stream and the gas stream may then pass through the exhaust 22 to the atmosphere. The exhaust gas stream may comprise 2.5 ppmvd $NO_x$. In another embodiment, the vessel 20 may comprise soda lime or another reactant for $NO_2$.

Aqueous absorption and/or reaction of higher order $N_xO_y$ molecules may be achieved in various ways. For example, for fuels with high sulfur content, aqueous absorption and/or reaction of higher order $N_xO_y$ molecules may be performed as part of a flue gas desulfurization ("FGD") process within an FGD unit. Various types of scrubbers may be employed to separate the higher order $N_xO_y$ molecules from the gas stream including spray towers, packed bed scrubbers, and/or venturi scrubbers.

In one embodiment, a system is provided for reducing $NO_x$ emissions comprising a gas production source configured to produce a gas stream comprising $NO_x$ and an oxidation catalyst positioned downstream of the gas production source. The oxidation catalyst may be configured to oxidize NO gas molecules in the gas stream to yield higher order $N_xO_y$ molecules. The system may further comprise a removal system positioned downstream of the oxidation catalyst configured to remove higher order $N_xO_y$ molecules from the gas stream by aqueous absorption or reaction.

In some embodiments, the majority of $NO_x$ molecules present in the gas stream are NO molecules before the gas stream contacts the oxidation catalyst. For example, in a gas turbine engine system, approximately 90% of the $NO_x$ molecules in the turbine exhaust may be NO. In some embodiments, the oxidation catalyst may oxidize about 50% or more of the NO molecules produced by the production source. In certain embodiments, the oxidation catalyst may oxidize about 75% or more of the NO molecules produced by the production source.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of reducing $NO_x$ emissions from a gas stream produced by a production source comprising:
   (a) oxidizing a portion of NO molecules present in the gas stream by contacting the gas stream with an oxidation catalyst to yield higher order $N_xO_y$ molecules, the gas stream having a temperature of 560° F. to about 700° F., wherein the oxidation catalyst is a flow through device having an internal honeycomb structure coated with a chemical catalyst; and thereafter
   (b) adding water or an aqueous solution to the gas stream downstream of the oxidation catalyst to remove higher order $N_xO_y$ molecules from the gas stream by solvent absorption or reaction, and
   wherein steps (a) and (b) are performed in a manner effective to remove at least 40% of the $NO_x$ molecules from the gas stream without the addition of ammonia or an oxidizing agent.

2. The method of claim 1, further comprising combusting a fuel to produce the gas stream, wherein the gas stream comprises the reaction products of the combustion of the fuel.

3. The method of claim 1, wherein the majority of $NO_x$ molecules in the gas stream are NO molecules before the gas stream is contacted with the oxidation catalyst.

4. The method of claim 1, wherein the production source comprises a gas turbine.

5. The method of claim 1, wherein the production source comprises a boiler, a furnace, a refinery processing plant, or a chemical processing plant.

6. The method of claim 1, wherein the aqueous solution is a lime based water solution.

7. The method of claim 1, wherein the oxidation catalyst oxidizes a portion of NO molecules to $N_2O_5$ molecules.

* * * * *